US011428234B2

United States Patent
Little

(10) Patent No.: US 11,428,234 B2
(45) Date of Patent: Aug. 30, 2022

(54) GAS TURBINE COMPRESSOR RADIAL DOOR BLEED VALVE

(71) Applicant: Raytheon Technologies Corporation, Farmington, CT (US)

(72) Inventor: Jonathan D. Little, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 196 days.

(21) Appl. No.: 16/869,847

(22) Filed: May 8, 2020

(65) Prior Publication Data

US 2021/0348618 A1 Nov. 11, 2021

(51) Int. Cl.
*F04D 27/02* (2006.01)
*F02K 3/075* (2006.01)

(52) U.S. Cl.
CPC ....... *F04D 27/0215* (2013.01); *F04D 27/023* (2013.01); *F02K 3/075* (2013.01); *F05D 2220/323* (2013.01); *F05D 2240/35* (2013.01); *F05D 2240/55* (2013.01); *F05D 2250/411* (2013.01); *F05D 2260/50* (2013.01); *F05D 2270/101* (2013.01)

(58) Field of Classification Search
None
See application file for complete search history.

(56) References Cited

U.S. PATENT DOCUMENTS

| 5,048,286 A * | 9/1991 | Stransky | F02C 9/18 60/226.3 |
|---|---|---|---|
| 5,054,286 A | 10/1991 | Stransky et al. | |
| 6,048,171 A | 4/2000 | Donnelly et al. | |
| 7,594,403 B2 | 9/2009 | Cadieux | |
| 9,506,424 B2 * | 11/2016 | Siering | F02K 3/075 |
| 10,287,992 B2 | 5/2019 | Tan et al. | |
| 2018/0252184 A1 | 9/2018 | Hatim | |

OTHER PUBLICATIONS

European Search Report for European Application No. 21172406.7, dated Oct. 8, 2021, 7 pages.

* cited by examiner

*Primary Examiner* — Kayla Mccaffrey
(74) *Attorney, Agent, or Firm* — Cantor Colburn LLP

(57) ABSTRACT

A bleed system of a gas turbine engine includes a bleed duct having a duct inlet located at a flowpath of a gas turbine engine, and a bleed outlet located outside of the flowpath, and extending circumferentially around a central longitudinal axis. A plurality of bleed doors are located at the bleed outlet and are arrayed along a circumferential length on the bleed duct. Each bleed door includes a first circumferential end, and a second circumferential end. The bleed doors are arrayed such that when the bleed doors are in a closed position the first circumferential end is located at the second circumferential end of an adjacent bleed door of the bleed doors. Each bleed door includes a pivot, such that each bleed door rotates about the pivot from the closed position covering the duct outlet to an opened position allowing a bleed airflow to pass through the duct outlet.

20 Claims, 6 Drawing Sheets

GAS TURBINE COMPRESSOR RADIAL DOOR BLEED VALVE

BACKGROUND

Exemplary embodiments of the present disclosure pertain to the art of gas turbine engines, and in particular to bleed valve configurations of compressors of gas turbine engines.

A gas turbine engine typically includes one or more bleed valves to bleed airflow from the compressor section. For example, such bleed valves may bleed airflow from the compressor section at a high pressure compressor or at a low pressure compressor of the gas turbine engine. The bleed valves are opened at operating conditions such as engine start to remove excess airflow from the core flowpath, and also opened during operation for, for example, engine surge avoidance.

One example of such a bleed valve is a low pressure compressor exit bleed valve, which when open allows airflow to bleed from the low compressor section. The bleed valve is an annular ring covering a bleed duct, the bleed duct extending from the compressor flow path. To open or close the bleed valve, the annular ring is moved axially and circumferentially. This axial motion of the valve requires additional axial space around the valve location to accommodate the axial travel of the valve. Thus, placement of flanges and/or other features of the compressor may be limited by the need for this additional axial space.

BRIEF DESCRIPTION

In one embodiment, a bleed system of a gas turbine engine includes a bleed duct having a duct inlet located at a flowpath of a gas turbine engine, and a bleed outlet located outside of the flowpath, the bleed duct extending circumferentially around a central longitudinal axis. A plurality of bleed doors are located at the bleed outlet and are arrayed along a circumferential length on the bleed duct. Each bleed door includes a first circumferential end, and a second circumferential end. The plurality of bleed doors are arrayed such that when the plurality of bleed doors are in a closed position the first circumferential end is located at the second circumferential end of an adjacent bleed door of the plurality of bleed doors. Each bleed door includes a pivot, such that each bleed door rotates about the pivot from the closed position covering the duct outlet to an opened position allowing a bleed airflow to pass through the duct outlet.

Additionally or alternatively, in this or other embodiments the pivot is secured to a fixed structure of the gas turbine engine.

Additionally or alternatively, in this or other embodiments the bleed system includes a synchronization ring, and a linkage arm extending from the synchronization ring to a bleed door of the plurality of bleed doors such that circumferential movement of the synchronization ring about the central longitudinal axis urges rotation of the bleed door about the pivot between the closed position and the open position.

Additionally or alternatively, in this or other embodiments the linkage arm is connected to the bleed door between the pivot and the first circumferential end of the bleed door.

Additionally or alternatively, in this or other embodiments the pivot is located at or near the second circumferential end of the bleed door.

Additionally or alternatively, in this or other embodiments the first circumferential end of each bleed door of the plurality of bleed doors circumferentially overlaps the second circumferential end of the adjacent bleed door of the plurality of bleed doors.

Additionally or alternatively, in this or other embodiments when the plurality of bleed doors are in the opened position, the bleed doors extend from their pivots in a circumferential swirl direction of the bleed airflow through the bleed duct.

Additionally or alternatively, in this or other embodiments each bleed door of the plurality of bleed doors includes a perimetrical seal to seal the bleed door to the duct outlet when the bleed door is in the closed position.

Additionally or alternatively, in this or other embodiments each bleed door of the plurality of bleed doors includes an inner radial surface extending through the duct outlet into the bleed duct when the bleed door is in the closed position.

Additionally or alternatively, in this or other embodiments the inner radial surface is profiled to allow for smooth egress of the bleed airflow from the duct outlet.

In another embodiment, a gas turbine engine includes a combustor, a turbine driven by combustion gases output from the combustor, and a compressor driven by the turbine. The compressor including a bleed system having a bleed duct having a duct inlet located at a flowpath of the compressor, and a bleed outlet located outside of the flowpath. The bleed duct extends circumferentially around a central longitudinal axis. A plurality of bleed doors are located at the bleed outlet and arrayed along a circumferential length on the bleed duct. Each bleed door includes a first circumferential end and a second circumferential end. The plurality of bleed doors are arrayed such that when the plurality of bleed doors are in a closed position the first circumferential end is located at the second circumferential end of an adjacent bleed door of the plurality of bleed doors. Each bleed door includes a pivot, such that each bleed door rotates about the pivot from the closed position covering the duct outlet to an opened position allowing a bleed airflow to pass through the duct outlet.

Additionally or alternatively, in this or other embodiments the pivot is secured to a fixed structure of the gas turbine engine.

Additionally or alternatively, in this or other embodiments the bleed system includes a synchronization ring, and a linkage arm extending from the synchronization ring to a bleed door of the plurality of bleed doors such that circumferential movement of the synchronization ring about the central longitudinal axis urges rotation of the bleed door about the pivot between the closed position and the open position.

Additionally or alternatively, in this or other embodiments the linkage arm is connected to the bleed door between the pivot and the first circumferential end of the bleed door.

Additionally or alternatively, in this or other embodiments the pivot is located at or near the second circumferential end of the bleed door.

Additionally or alternatively, in this or other embodiments the first circumferential end of each bleed door of the plurality of bleed doors circumferentially overlaps the second circumferential end of the adjacent bleed door of the plurality of bleed doors.

Additionally or alternatively, in this or other embodiments when the plurality of bleed doors are in the opened position, the bleed doors extend from their pivots in a circumferential swirl direction of the bleed airflow through the bleed duct.

Additionally or alternatively, in this or other embodiments each bleed door of the plurality of bleed doors includes a perimetrical seal to seal the bleed door to the duct outlet when the bleed door is in the closed position.

Additionally or alternatively, in this or other embodiments each bleed door of the plurality of bleed doors includes an inner radial surface extending through the duct outlet into the bleed duct when the bleed door is in the closed position.

Additionally or alternatively, in this or other embodiments the inner radial surface is profiled to allow for smooth egress of the bleed airflow from the duct outlet.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
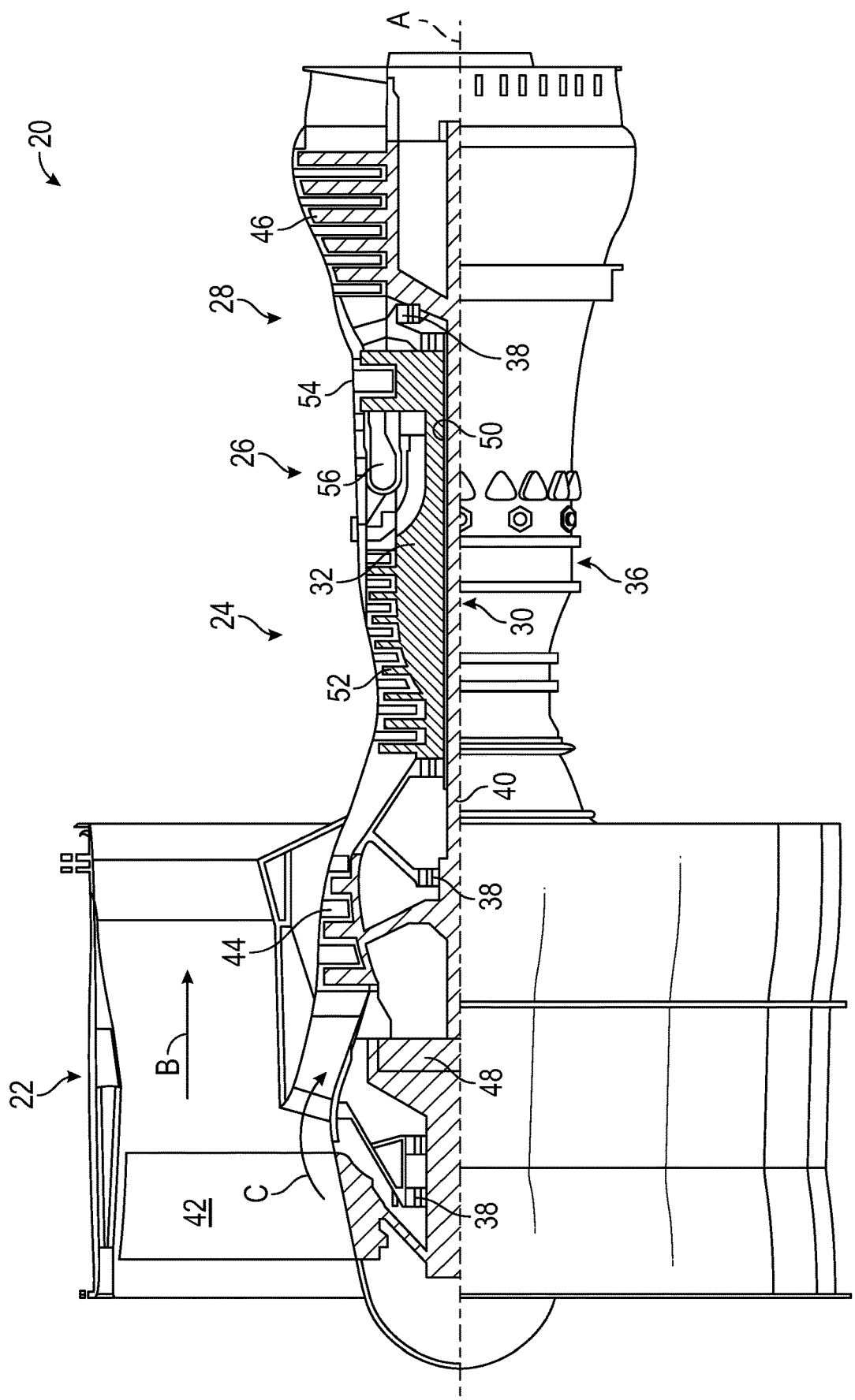
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
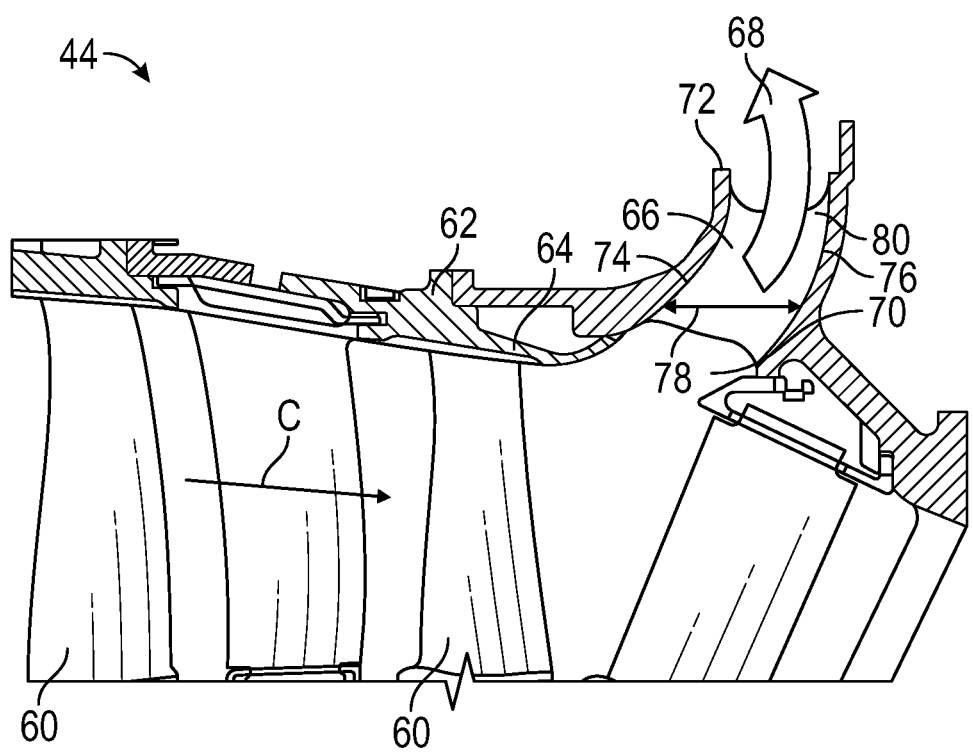
FIG. 2 is a partial cross-sectional view of a compressor section of a gas turbine engine.

Referring now to FIG. 2, illustrated is a partial cross-section of the low pressure compressor 44. The low pressure compressor includes one or more low compressor rotors 60 disposed in a compressor case 62 or other static structure. An inner wall 64 of the compressor case 62 at least partially defines core flowpath C through the low pressure compressor 44. The low pressure compressor 44 further includes one or more bleed ducts 66 extending outwardly from the core flowpath C to selectably direct bleed airflow 68 from the core flowpath C to a location outside of the low pressure compressor 44, such as to the turbine section 28 to be utilized for component cooling, or overboard. The bleed duct 66 extends from a duct inlet 70 at the core flowpath C to a duct outlet 72 radially outboard of the core flowpath C. Further, the bleed duct 66 has an upstream duct wall 74 defining an upstream extent of the bleed duct 66 relative to the engine central longitudinal axis A, and a downstream duct wall 76 opposite the upstream duct wall 74 thereby defining an axial width 78 of the bleed duct 66. The upstream duct wall 74 and the downstream duct wall 76 extend circumferentially about the engine longitudinal axis A. In some embodiments, one or more duct struts 80 extend from the upstream duct wall 74 to the downstream duct wall 76 to provide structural support to the bleed duct 66, and divide the bleed duct 66 into a plurality of circumferential bleed duct segments 82, as best shown in FIG. 3.

Figure 3:
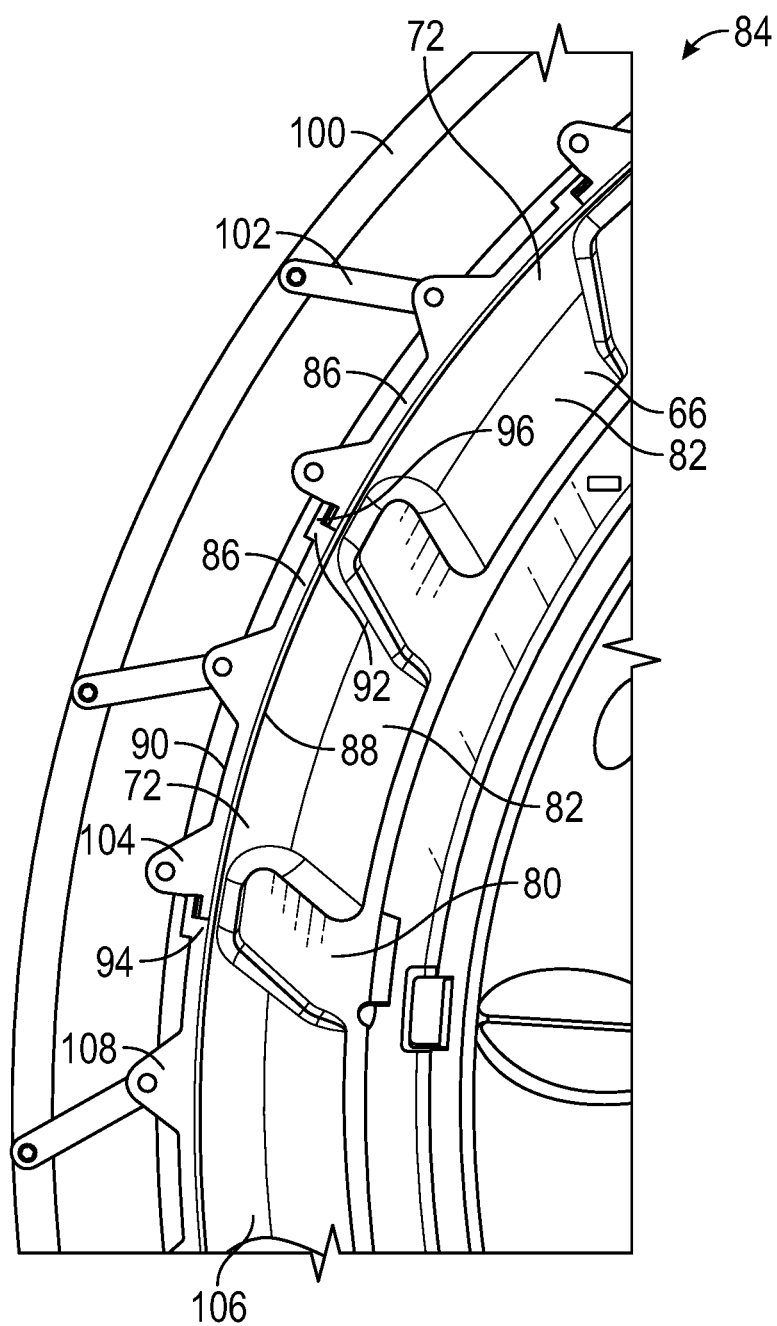
FIG. 3 is a partial cross-sectional view of an embodiment of a bleed door system in a closed position.
Figure 4:
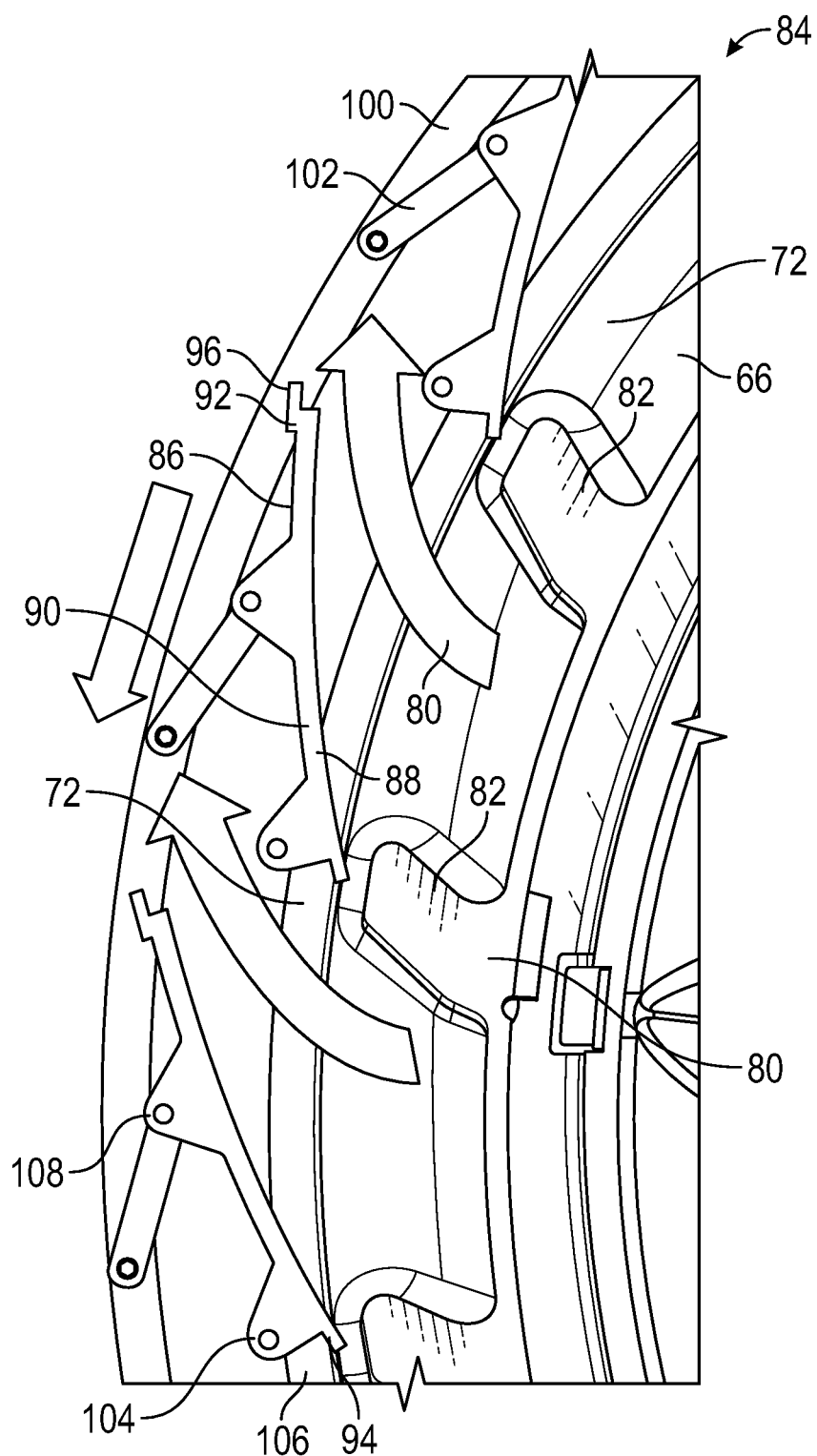
FIG. 4 is a partial cross-sectional view of an embodiment of a bleed door system in an opened position.
Figure 5:
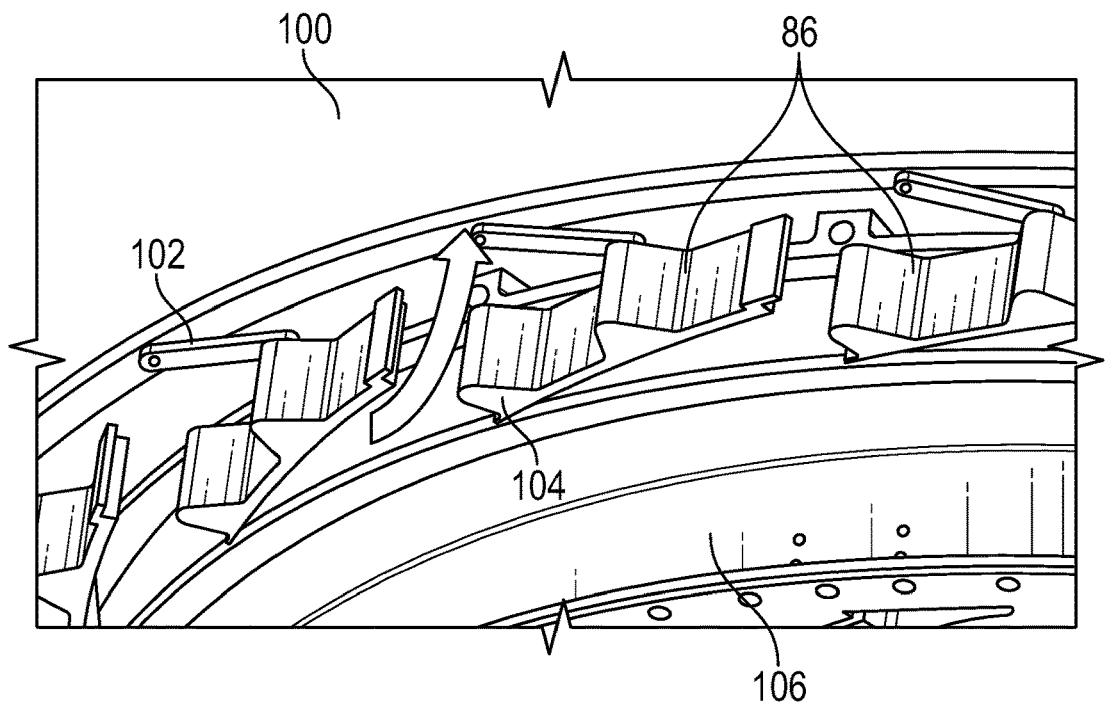
FIG. 5 is a partial perspective view of an embodiment of a bleed door system in an opened position.

Referring now to FIGS. 3, 4 and 5, illustrated is an embodiment of a bleed door system 84. The bleed door system 84 includes a plurality of bleed doors 86 arrayed circumferentially about the bleed duct 66. In some embodiments, each bleed door 86 of the plurality of bleed doors is located at a corresponding bleed duct segment 82 of the plurality of bleed duct segments 82. The plurality of bleed doors 86 are located at the duct outlet 72, closing the duct outlet 72 when the bleed doors 86 are in a closed position as in FIG. 3, and allowing bleed airflow 68 to pass through the duct outlet 72 when the bleed doors 86 are in an open position as shown in FIG. 4.

Each bleed door 86 has an inner door surface 88 closed to the duct outlet 72 and an outer door surface 90 opposite the inner door surface 88. The bleed door 86 includes a first circumferential end 92 and a second circumferential end 94 opposite the first circumferential end 92. The bleed doors 86 are circumferentially arrayed such that a first circumferential end 92 of a bleed door 86 abuts a second circumferential end 94 of an adjacent bleed door 86. In some embodiments, the first circumferential end 92 includes a lip 96, which overlaps the second circumferential end 94 of the adjacent bleed door 86, as shown in FIG. 3. In some embodiments, a seal (not shown) extends around a perimeter of the bleed door 86 to improve sealing to the duct outlet 72 when the bleed doors 86 are in the closed position. While in some embodiments, the bleed door 86 seals to the duct outlet 72, in other embodiments the adjacent bleed doors 86 may seal to each other in addition to or as an alternative to sealing to the duct outlet 72.

The bleed door system 84 further includes a synchronization ring 100 that is driven circumferentially about the engine central longitudinal axis A, by an actuator (not shown). The synchronization ring 100 is operably connected to each of the bleed doors 86 such that the circumferential movement of the synchronization ring 100 moves the bleed doors 86 between the closed position and open position as shown in FIGS. 3 and 4.

The synchronization ring 100 is connected to the bleed doors 86 by a linkage arm 102 extending between the synchronization ring 100 and the bleed doors 86. The bleed doors 86 each include a pivot 104 at which the bleed door 86 is rotationally connected to a static structure, such as case 106. In some embodiments the pivot 104 is located at or near the second circumferential end 94. The linkage arm 102 connects to the bleed door 86 between the pivot 104 and the first circumferential end 92. In some embodiments, the bleed door 86 includes ribs or protrusions 108 extending from the outer door surface 90 to accommodate the pivot 104 and attachment of the linkage arm 102. As shown in FIG. 4, circumferential rotation of the synchronization ring 100 urges the bleed doors 86 to each rotate radially outwardly about their respective pivot 104 and move from the closed position to the open position, thereby allowing the bleed airflow 68 therethrough.

As shown in FIG. 4, the bleed airflow 68 in the bleed duct 66 has a circumferential component, or swirl. The bleed doors 86 are oriented such that when in the opened position, the bleed doors 86 extend from the pivot 104 in the swirl direction. This orientation reduces flow losses when the bleed doors 86 are open. Further, referring again to FIG. 3, when the bleed doors 86 are closed, the synchronization ring 100 is aligned so that maximum mechanical advantage from the corresponding position of the linkage arms 102 is applied to the bleed doors 86 during high load conditions, thus maintaining closure of the bleed doors 86. Conversely, motion of the linkage arms 102 increases in the opening direction when air is required to be dumped quickly.

Figure 6:
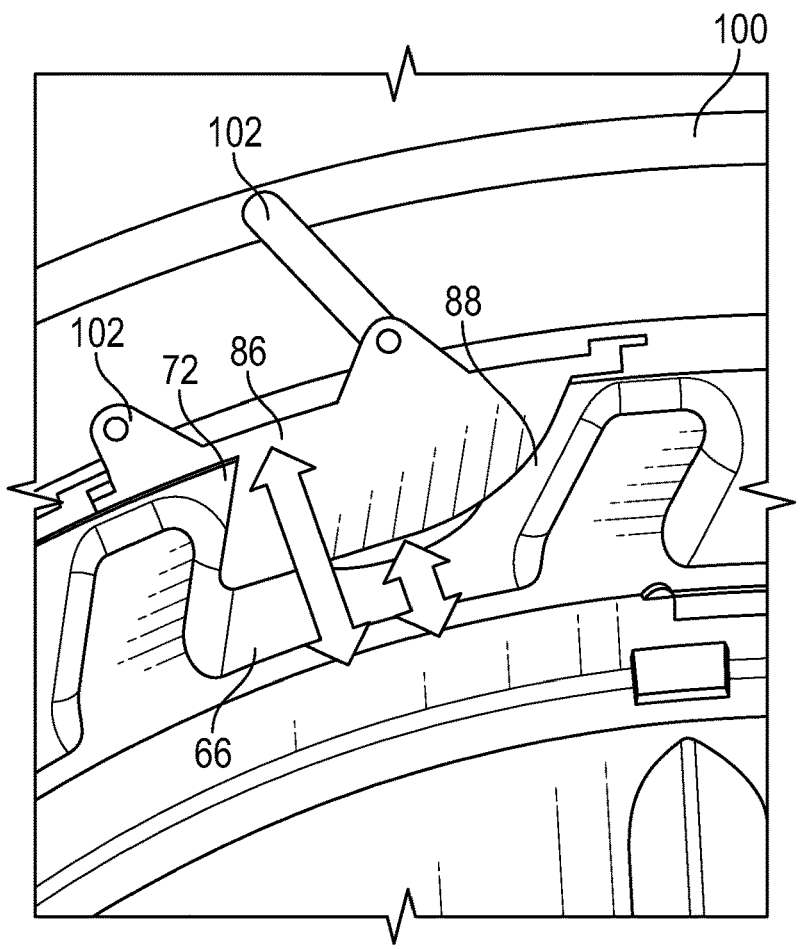
FIG. 6 is a partial cross-sectional view of another embodiment of a bleed door system in a closed position.
Figure 7:
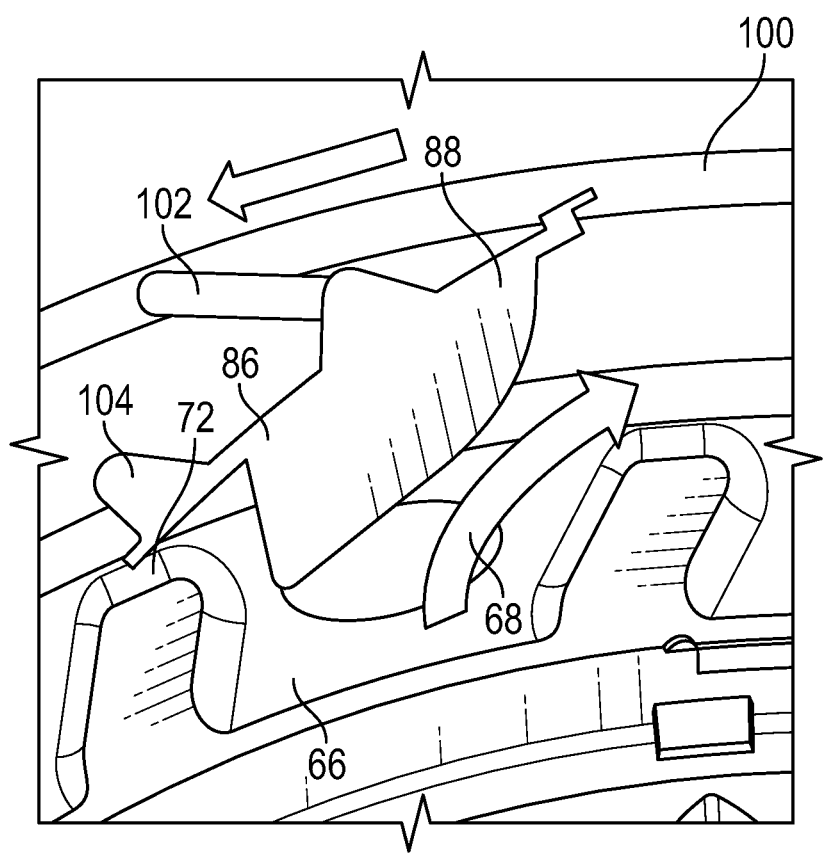
FIG. 7 is a partial cross-sectional view of another embodiment of a bleed door system in an opened position.

In some embodiments, such as shown in FIGS. 6 and 7, the inner door surface 88 extends at least partially into the bleed duct 66, reducing an effective length of the bleed duct 66 from the duct inlet 70 to the inner door surface 88. This reduction in effective length increases an effective acoustic frequency of the bleed duct 66 consistent with the length reduction when the bleed door 86 is in the closed position, as shown in FIG. 6. Further, the inner door surface 88 may be contoured or profiled to allow smooth egress of the bleed airflow 68 when the bleed door 86 is in the open position, as shown in FIG. 7.

The bleed door system 84 configurations illustrated and described herein require less axial space than the typical axially-opening bleed valve configuration and reduces or removes axial design constraints due to the bleed valve. Further, the bleed doors 86 may be configured to extend radially into the bleed duct 66 to provide frequency tuning solutions to address flowpath resonance issues.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bleed system of a gas turbine engine, comprising:
a bleed duct having a duct inlet located at a flowpath of a gas turbine engine, and a bleed outlet located outside of the flowpath, the bleed duct extending circumferentially around a central longitudinal axis;
a plurality of bleed doors located at the bleed outlet and arrayed along a circumferential length on the bleed duct, each bleed door including:
a first circumferential end;
a second circumferential end, the plurality of bleed doors arrayed such that when the plurality of bleed doors are in a closed position the first circumferential end is located at the second circumferential end of an adjacent bleed door of the plurality of bleed doors; and
a pivot, such that each bleed door rotates about the pivot from the closed position covering the duct outlet to an opened position allowing a bleed airflow to pass through the duct outlet;
wherein in the opened position the first circumferential end is disposed radially outboard of the second circumferential end.

2. The bleed system of claim 1, wherein the pivot is secured to a fixed structure of the gas turbine engine.

3. The bleed system of claim 1, further comprising:
a synchronization ring; and
a linkage arm extending from the synchronization ring to a bleed door of the plurality of bleed doors such that circumferential movement of the synchronization ring about the central longitudinal axis urges rotation of the bleed door about the pivot between the closed position and the open position.

4. The bleed system of claim 3, wherein the linkage arm is connected to the bleed door between the pivot and the first circumferential end of the bleed door.

5. The bleed system of claim 4, wherein the pivot is located at or near the second circumferential end of the bleed door.

6. The bleed system of claim 1, wherein the first circumferential end of each bleed door of the plurality of bleed doors circumferentially overlaps the second circumferential end of the adjacent bleed door of the plurality of bleed doors.

7. The bleed system of claim 1, wherein when the plurality of bleed doors are in the opened position, the bleed doors extend from their pivots in a circumferential swirl direction of the bleed airflow through the bleed duct.

8. The bleed system of claim 1, wherein each bleed door of the plurality of bleed doors includes a perimetrical seal to seal the bleed door to the duct outlet when the bleed door is in the closed position.

9. A bleed system of a gas turbine engine, comprising:
a bleed duct having a duct inlet located at a flowpath of a gas turbine engine, and a bleed outlet located outside of the flowpath, the bleed duct extending circumferentially around a central longitudinal axis;
a plurality of bleed doors located at the bleed outlet and arrayed along a circumferential length on the bleed duct, each bleed door including:
a first circumferential end;
a second circumferential end, the plurality of bleed doors arrayed such that when the plurality of bleed doors are in a closed position the first circumferential end is located at the second circumferential end of an adjacent bleed door of the plurality of bleed doors; and
a pivot, such that each bleed door rotates about the pivot from the closed position covering the duct outlet to an opened position allowing a bleed airflow to pass through the duct outlet;
wherein each bleed door of the plurality of bleed doors includes an inner radial surface extending through the duct outlet into the bleed duct when the bleed door is in the closed position.

10. The bleed system of claim 9, wherein the inner radial surface is profiled to allow for smooth egress of the bleed airflow from the duct outlet.

11. A gas turbine engine, comprising:
a combustor;
a turbine driven by combustion gases output from the combustor; and
a compressor driven by the turbine, the compressor including a bleed system including:
a bleed duct having a duct inlet located at a flowpath of the compressor, and a bleed outlet located outside of the flowpath, the bleed duct extending circumferentially around a central longitudinal axis;
a plurality of bleed doors located at the bleed outlet and arrayed along a circumferential length on the bleed duct, each bleed door including:
a first circumferential end;
a second circumferential end, the plurality of bleed doors arrayed such that when the plurality of bleed doors are in a closed position the first circumferential end is located at the second circumferential end of an adjacent bleed door of the plurality of bleed doors; and
a pivot, such that each bleed door rotates about the pivot from the closed position covering the duct outlet to an opened position allowing a bleed airflow to pass through the duct outlet;
wherein in the opened position the first circumferential end is disposed radially outboard of the second circumferential end.

12. The gas turbine engine of claim 11, wherein the pivot is secured to a fixed structure of the gas turbine engine.

13. The gas turbine engine of claim 11, further comprising:
a synchronization ring; and
a linkage arm extending from the synchronization ring to a bleed door of the plurality of bleed doors such that circumferential movement of the synchronization ring about the central longitudinal axis urges rotation of the bleed door about the pivot between the closed position and the open position.

14. The gas turbine engine of claim 13, wherein the linkage arm is connected to the bleed door between the pivot and the first circumferential end of the bleed door.

15. The gas turbine engine of claim 14, wherein the pivot is located at or near the second circumferential end of the bleed door.

16. The gas turbine engine of claim 11, wherein the first circumferential end of each bleed door of the plurality of bleed doors circumferentially overlaps the second circumferential end of the adjacent bleed door of the plurality of bleed doors.

17. The gas turbine engine of claim 11, wherein when the plurality of bleed doors are in the opened position, the bleed doors extend from their pivots in a circumferential swirl direction of the bleed airflow through the bleed duct.

18. The gas turbine engine of claim 11, wherein each bleed door of the plurality of bleed doors includes a perimetrical seal to seal the bleed door to the duct outlet when the bleed door is in the closed position.

19. The gas turbine engine of claim 11, wherein each bleed door of the plurality of bleed doors includes an inner radial surface extending through the duct outlet into the bleed duct when the bleed door is in the closed position.

20. The gas turbine engine of claim 19, wherein the inner radial surface is profiled to allow for smooth egress of the bleed airflow from the duct outlet.

\* \* \* \* \*